US010951246B2

(12) United States Patent
Lax et al.

(10) Patent No.: US 10,951,246 B2
(45) Date of Patent: Mar. 16, 2021

(54) MULTI-CHANNEL RADIO COMMUNICATION DEVICE (71) Applicant: Elbit Systems C4I and Cyber Ltd., Netanya (IL)

(72) Inventors: Avi Lax, Netanya (IL); Yehuda Gillbert Eder, Netanya (IL); Neta Ben Yishay, Netanya (IL)

(73) Assignees: ELBIT SYSTEMS C4I AND CYBER LTD., Netanya (IL); HA-GAVISH STREET. POLEG INDUSTRIAL ZONE 5, Netanya (IL)

(*) Notice: Subject to any disclaimer, the term of this patent is extended or adjusted under 35 U.S.C. 154(b) by 0 days.

(21) Appl. No.: 16/750,017

(22) Filed: Jan. 23, 2020

(65) Prior Publication Data
US 2020/0195282 A1 Jun. 18, 2020

Related U.S. Application Data (63) Continuation-in-part of application No. PCT/IL2019/050606, filed on May 28, 2019.

(30) Foreign Application Priority Data

Aug. 12, 2018 (IL) .......................................... 261101

(51) Int. Cl.
H04B 1/00 (2006.01)
H04B 1/16 (2006.01)

(52) U.S. Cl.
CPC ............. H04B 1/0067 (2013.01); H04B 1/16 (2013.01)

(58) Field of Classification Search
CPC ........ H04B 1/0067; H04B 1/16; H04B 1/006; H04B 1/26; H04B 1/0057; H04B 7/0413; H03H 9/64

(Continued)

(56) References Cited

U.S. PATENT DOCUMENTS 6,236,731 B1 * 5/2001 Brennan ............ H03H 17/0266
381/312
7,092,676 B2 * 8/2006 Abdelgany ............ H04B 1/005
455/76

(Continued)

FOREIGN PATENT DOCUMENTS

CN 103580644 2/2014
IL 243028 9/2017

(Continued)

OTHER PUBLICATIONS

Bostian, Charles W., et al. Trade study of implementation of software defined radio (sdr): Fundamental limitations and future prospects. No. 430304. Wireless@ Virginia Tech Blacksburg VA, 2008.

(Continued)

Primary Examiner — Ankur Jain (57) ABSTRACT

A multi-channel communication device comprising: a plurality of receivers, each usable for receiving radio-signals within a corresponding distinct selected frequency band within a spectrum; a Radio Frequency (RF) power splitter usable for splitting an input radio-signal into a plurality of split radio-signals; and a filter bank that comprises a plurality of filters each having a respective distinct passband within the spectrum, and a routing mechanism configured to route each of the split radio-signals into respective selected filters of the filters, selected in accordance with the selected frequency band of each of the receivers, wherein each of the selected filters outputs a corresponding output radio-signal, in the passband of the respective filter, to a respective receiver of the receivers.

25 Claims, 7 Drawing Sheets (58) Field of Classification Search
USPC .................................................. 455/132, 133
See application file for complete search history.

(56) References Cited

U.S. PATENT DOCUMENTS

| | | | | |
|---|---|---|---|---|
| 7,590,205 | B2* | 9/2009 | Zipper | H04B 1/28 375/316 |
| 8,090,326 | B1* | 1/2012 | Wu | H04B 1/0057 455/553.1 |
| 8,462,889 | B2* | 6/2013 | Gupta | H04B 1/005 375/340 |
| 9,350,404 | B2 | 5/2016 | Adnani et al. | |
| 9,680,521 | B2* | 6/2017 | Andersson | H04B 1/525 |
| 2009/0088124 | A1 | 4/2009 | Schuur et al. | |
| 2009/0180466 | A1 | 7/2009 | Soul et al. | |
| 2013/0230080 | A1 | 9/2013 | Gudem et al. | |
| 2018/0367167 | A1* | 12/2018 | Sorokopud | H04B 1/005 |

FOREIGN PATENT DOCUMENTS

| | | |
|---|---|---|
| RU | 2333596 | 9/2008 |
| WO | 2017098497 | 6/2017 |

OTHER PUBLICATIONS

"Satellite switched FDMA advanced communication technology satellite program." (Retrieved on Aug. 20, 2019). Retrieved from the Internet: < http://hdl.handle.net/2060/19830007272> Atwood, S. et al. Dec. 1, 1982 (Dec. 1, 1982).
https://www.maximintegrated.com/en/design/technical-documents/app-notes/3/3632.html.
Marjan Grman, "Managing Phase Noise in Microwave Chains", Nov. 12, 2010, microwavejournal.com https://www.microwavejournal.com/articles/12435-managing-phase-noise-in-microwave-chains.
"Considering a non-uniform filter bank in an UWB Multi Band On-Off Keying transceiver," Journal of Communications, vol. 2, No. 6, Nov. 2007.
He Shi-tang, "Research progress in SAW filter banks", Journal of Zhejiang University Science A 2005 vol. 6 No. 9 p. 990-996, 10.1631/jzus.2005.A0990.
https://www.vectron.com/products/brochures/saw_brochure.pdf.
S. Gopani, R. Mouton, R. Hays, R. Almar, J. Vandendriessche and M. Garrity, "State-of-the-art SAW channelizer for EW receiver application," 1994 Proceedings of IEEE Ultrasonics Symposium, Cannes, France, 1994, pp. 55-60 vol. 1, doi: 10.1109/ULTSYM.1994.401551.
Ka-Band Dual-Mode Super Q Filters and Multiplexers, Bahram Yassini, Member, IEEE, and Ming Yu, Fellow, IEEE IEEE Transactions on Microwaves Theory and Techniques, vol. 63, No. 10 Oct. 2015.
Dissertation entitled "Front End Circuit Module Designs for a Digitally Controlled Channelized SDR Receiver Architecture" submitted by F.Gong to The Ohio State University in 2011.
"White Space Communication Technologies" by N. B. Carvalho, A. Cidronali and R. Gomez-Garcia, HardbackISBN: 9781107055919, Oct. 2014.
"Advanced channelization for RF, microwave, and millimeterwave applications" G.W Anderson et al. (Proceedings of the IEEE vol. 79, Issue: 3, Mar. 1991 pp. 355-388).
"21 Channel SAW Channelizer Filter Bank" Shitang He, Wen Wang, Shunzhou Li, Jiansheng Liu and Yong Liang Institute of Acoustics, Chinese Academy of Sciences, Beijing 100080, China . 2004 IEEE International Ultrasonics, Ferroelectrics and Frequency Control Joint 50th Anniversary Conference.
Bio-Inspired Hybrid Filter Bank for Software-Defined Radio Receivers of J. P. Magalhäes, J. M. N. Vieira, R Gómez-García, N. Carvalho published in the IEEE Transactions on Microwave theory and Techniques, vol. 61, No. 4, Apr. 2013.
"SAW Based Systems for Mobile Communications Satellites", R.C. Peach, N. Miller and M. Lee, circa 1993.
"Implementation of Filter Bank-Based RF Transceiver for TV White Space", Kyu-Min Kang et. al, ETRI Journal, vol. 37, No. 6, Dec. 2015.
"Digital techniques for wide band receivers. Chap 10—Frequency channelization", J, Tsui et al, Scitech publishing, 2nd edition 2015.
Surface Acoustic Wave Devices in EW, N.K. Joshi & A. Singh, Aug. 1976.
Real-Time RF Spectrum Analyzer: Components and System Development, Palmer et.al, Sandia National Laboratories, IEEE 2008.
"Fast ADC Facilitates Direct RF Sampling at Higher Frequencies" Lou Frenzel Sep. 5, 2017 https://www.electronicdesign.com/technologies/analog/article/21805523/fast-adc-facilitates-direct-rf-sampling-at-higher-frequencies.
ADCS of SDR Parameters, Design Considerations and Implementations Aug. 2011 Presented by Spectrum Signal Processing and Intersil Corporation (Power Point) https://winnf.memberclicks.net/assets/documents/ADCs-of-SDR_r3p1_1_.pdf.
"BAW filter bank for an UWB Multi Band On-Off Keying transceiver," IEEE Proceedings of Asia-Pacific Microwave Conference, 2007, M.L.S. Peflaloza, G.Baudoin, M. Villegas, L.A. Montes.
"Microwave Receivers with Electronic Warfare Applications," James B. Tsui, IET Digital Library, 2005.

* cited by examiner

MULTI-CHANNEL RADIO COMMUNICATION DEVICE

TECHNICAL FIELD

The invention relates to the field of radio communications and more specifically to a multi-channel radio communication device.

BACKGROUND

An ever-increasing need exists for current communication solutions to increase their bandwidth, while dealing with dwindling spectral resources. The probability of locating uninterrupted and sequential spectrum for enlarging the capacity of communication devices by increasing the bandwidth is almost non-existent.

Communication devices, and specifically military grade communication devices, are adopting the Software Defined Radio (SDR) architecture, having capabilities of simultaneously communicating through several communication networks, while receiving/transmitting in a number of waveforms (multi-channel radio).

Several existing architectures enable implementing multi-channel radio, each having its own advantages and disadvantages. One example includes utilization of multiple super heterodyne receivers, each being a well-known device having selectivity capabilities and a large dynamic range, and each heterodyne receiver being independent of the other heterodyne receivers. The disadvantages of this architecture are in the linear growth of the current required to support any additional channel, and in the linear growth of the size of the electronic circuits required to support each additional channel. In addition, this architecture combines a large number of frequency sources, thereby increasing the complexity of this architecture. Still further, this architecture is limited in the time required for hopping between frequencies. Another limitation of this architecture, arising from the splitting of an incoming signal from one antenna to multiple routes, is a requirement for a Low-Noise Amplifier (LNA) having high linearity. In addition, implementing a FDD (Frequency Division Duplex) solution in such architecture requires high isolation between the antennas, or alternatively a separation to two sub-bands, one for transmission and one for reception, with a "dead" zone between them, which results in wasting frequency resources.

Another example of an existing architecture is direct sampling. Recent technological advancements enable sampling signals in high sampling rates and in high frequencies. This capability enables connecting a sampler directly to the antenna, thereby rendering the multi-channel radio a true SDR. This solution is simple, and substantially reduces the required electronics and circuitry. However, this solution entails many disadvantages that substantially affect the performance of the receiver, including low selectivity relying only on digital selectivity, a low dynamic range, a strict clock accuracy requirement due to high Radio Frequency (RF) reception, as well as adding of multiple signals at the entry to the sampler without separating them in frequency, which requires very high linearity and is poorly suitable for noisy tactical environments. In addition, also in this architecture implementing an FDD solution requires high isolation between the antennas.

There is thus a need in the art for a new multi-channel communication device.

References considered to be relevant as background to the presently disclosed subject matter are listed below. Acknowledgement of the references herein is not to be inferred as meaning that these are in any way relevant to the patentability of the presently disclosed subject matter.

Bostian, Charles W., et al., "Trade study of implementation of software defined radio (SDR): Fundamental limitations and future prospects", WIRELESS@ VIRGINIA TEC, Dec. 9, 2008, discloses that Software Defined Radio (SDR) technology is commonly advocated for waveform and frequency-agile radios. It works well for simple signals and limited bandwidths, less so for complex broadband waveforms. Whether these difficulties reflect theoretical limits or design choices was unknown since few quantified limits exist. Using literature surveys and analysis this report explores fundamental limits to SDR bandwidth and waveform.

U.S. Pat. No. 9,350,404 (Adnani et al.), published on May 24, 2016, discloses that wireless communication is ubiquitous today with increasing deployments leading to increased interference, increasing conflicts, etc. Monitoring the wireless environment is therefore important for regulators, service providers, Government agencies, enterprises etc. Such monitoring should be flexible both in networks monitored within the wireless environment as well as detecting unauthorized transmitters, allowing dynamic network management, etc. However, such real time spectral/signal analysis in the prior art requires both a wideband direct conversion receiver (DCR), for high performance, wideband, fast, programmable spectral analysis, and a super heterodyne receiver for fast, narrowband, programmable demodulation for signal analysis. According to embodiments of the invention a single receiver design methodology exploiting a single RF circuit to provide super heterodyne and direct conversion receiver functionalities.

Russian Patent No. 2333596 pertains to wireless communication and can be used for selecting radio signals in input cascades of radio receiving devices. The multi-channel filter on surface acoustic waves has input and output terminals, input and output commutators, each of which consists of N switches on the number of filter channels, with their control inputs, frequency-selective unit with an amplifier, between the input and output commutators and consisting of N channels, each of which has input and output filters on surface acoustic waves, channel input and output switches with their control inputs, first and second group electric bus lines. The input terminal is connected to the inputs of the switch of the input commutator, and the output terminal is connected to the outputs of the switch of the output commutator. There are N−1 amplifiers in the frequency-selective unit. In each channel of the frequency-selective unit the input of the amplifier is connected to the output of the input filter on surface acoustic waves of the first group electric bus line, and the output of the amplifier is connected to the input of the output filter on surface acoustic waves of the second group electric bus line. The input of the channel input switch is connected to the output of the corresponding switch of the input commutator, and the output of the channel input switch is connected to the input of the output filter on surface acoustic waves. The input of the channel output switch is connected to the output of the output filter on surface acoustic waves, and the channel output switch is connected to the input of the corresponding switch of the output commutator. In that case the length of the first and second group electric bus lines does not increase with increase in the number of channels and the central frequency of the input and output filters on surface acoustic waves.

International Publication No. WO 2017/098497 (Sorokopud et al.), published on Jun. 15, 2017 discloses multi-channel communication devices and methods, which employ a filter bank, connected between antenna(s) and wideband converter(s), that comprises many narrowband surface acoustic wave (SAW) filters having respective distinct frequency bands within a bandwidth of the wideband converter(s). For example, devices may be configured as multi-channel receivers with SAW filters replacing current heterodyne circuitry and achieving effective separation of reception channel and effective attenuation of adjacent blocking signals in a compact device. In other examples, devices may be configured as multi-channel transmitters and/or transceivers, possibly having a variable number of channels, to realize compact multi-channel radio.

GENERAL DESCRIPTION

In accordance with a first aspect of the presently disclosed subject matter, there is provided a multi-channel communication device comprising: a plurality of receivers, each usable for receiving radio-signals within a corresponding distinct selected frequency band within a spectrum; a Radio Frequency (RF) power splitter usable for splitting an input radio-signal into a plurality of split radio-signals; and a filter bank that comprises a plurality of filters each having a respective distinct passband within the spectrum, and a routing mechanism configured to route each of the split radio-signals into respective selected filters of the filters, selected in accordance with the selected frequency band of each of the receivers, wherein each of the selected filters outputs a corresponding output radio-signal, in the passband of the respective filter, to a respective receiver of the receivers.

In some cases, the filters are one or more of: Surface Acoustic Wave (SAW) filters, Bulk Acoustic Wave (BAW) filters, ceramic filters or cavity filters.

In some cases, utilization of the RF power splitter enables at least one pair of distinct selected frequency bands to be adjacent.

In some cases, the passbands of the filters cover all of the spectrum.

In some cases, the passbands of at least one adjacent pair of the filters overlap by at least a bandwidth of the selected frequency band.

In some cases, the passbands of each pair of adjacent filters overlap by at least the bandwidth of the selected frequency band.

In some cases, the overlap enables employing Maximal-Ratio Combining (MRC) on at least one of the incoming radio-signals having a frequency within the overlapping portion of the passbands of the adjacent pair.

In some cases, the multi-channel communication device, further comprising: a frequency converter usable to convert a Radio Frequency (RF) signal to a converted radio-signal having an Intermediate Frequency (IF), wherein the input radio-signal is the converted radio-signal.

In some cases, the frequency converter comprises: a Local Oscillator (LO) usable to output a LO signal at a fixed frequency; and a mixer usable to receive the RF signal and the LO signal, and to output the converted radio-signal.

In some cases, the LO's noise is at least reduced using a narrow band filter.

In some cases, the frequency converter is a passive frequency converter, and wherein the multi-channel communication device further comprises a first amplifying device for amplifying the RF signal before it is received by the passive frequency converter.

In some cases, the frequency converter is a first active frequency converter, and wherein the frequency converter further comprises a first internal amplifying device for amplifying the RF signal before it is received by the mixer.

In some cases, a frequency of each of the incoming radio-signals is an Ultra High Frequency (UHF).

In some cases, the passband of each of the filters is an Ultra High Frequency (UHF) passband.

In some cases, the IF is UHF.

In some cases, the multi-channel communication device, further comprising a frequency hopping mechanism configured to instruct the routing mechanism to switch between frequencies as part of a frequency hopping process, in synchronization with one or more other communication devices, wherein a time required to hop between subsequent frequencies is a time required for the routing mechanism to switch between the subsequent frequencies.

In some cases, the multi-channel communication device, further comprising a transmitter capable of transmitting one or more outgoing signals in an outgoing frequency range, wherein each of the outgoing signals has a corresponding outgoing frequency within the outgoing frequency range, and each of the outgoing signals is filtered by one or more respective filters of the plurality of filters having a passband associated with the outgoing frequency of the outgoing signal.

In some cases, the multi-channel communication device, further comprising a digital bandwidth aggregation mechanism configured to: obtain information having a given outgoing bandwidth, wherein the given outgoing bandwidth is not continuously available within the outgoing frequency range; and generate the outgoing signals so that each outgoing signal covers an available portion of the outgoing frequency range, wherein the outgoing signals, when combined, cover the given outgoing bandwidth.

In some cases, utilization of the filter bank enables the transmitter to simultaneously transmit an outgoing signal while at least one of the receivers receives the corresponding output radio-signal without mutual interference, thereby enabling a full-duplex conversation.

In some cases, a multi-channel Multiple Input and Multiple Output (MIMO) device, comprising: a plurality of multi-channel communication devices in accordance with first aspect, wherein each of the multi-channel communication devices receives a corresponding signal as the input radio-signal and each outputs, utilizing the filter bank, a plurality of output frequencies, wherein at least two common frequencies of the output frequencies outputted by at least two of the devices are identical; and a processing resource, wherein the processing resource is configured to: receive the output frequencies and perform MIMO on the at least two common frequencies.

In accordance with a second aspect of the presently disclosed subject matter, there is provided a multi-channel communication device comprising: a plurality of receivers, each usable for receiving radio-signals within a corresponding distinct selected frequency band within a spectrum; a frequency converter usable to convert a Radio Frequency (RF) signal to a converted radio-signal having an Intermediate Frequency (IF); and a filter bank that comprises a plurality of filters each having a respective distinct passband within the spectrum and a routing mechanism; wherein the routing mechanism routes one or more incoming radio-signals, being the respective converted radio-signal, or one or more split radio-signals split from the converted radio-signal, into a plurality of selected filters of the filters, the plurality of selected filters being selected in accordance with the selected frequency band of each of the receivers, and wherein each of the selected filters outputs a corresponding output radio-signal, in the passband of the respective filter, to a respective receiver of the receivers.

In some cases, the filters are one or more of: Surface Acoustic Wave (SAW) filters, Bulk Acoustic Wave (BAW) filters, ceramic filters or cavity filters.

In some cases, the passbands of the filters cover all of the spectrum.

In some cases, the passbands of at least one adjacent pair of the filters overlap by at least a bandwidth of the selected frequency band.

In some cases, the passbands of each pair of adjacent filters overlap by at least the bandwidth of the selected frequency band.

In some cases, the overlap enables employing Maximal-Ratio Combining (MRC) on at least one of the incoming radio-signals having a frequency within the overlapping portion of the passbands of the adjacent pair.

In some cases, the frequency converter comprises: a Local Oscillator (LO) usable to output a LO signal at a fixed frequency; and a mixer usable to receive the RF radio-signal and the LO signal, and to output the converted radio-signal.

In some cases, the LO's noise is at least reduced using a narrow band filter.

In some cases, the frequency converter is a passive frequency converter, and wherein the multi-channel communication device further comprises a second amplifying device for amplifying the RF signal before it is received by the passive frequency converter.

In some cases, the frequency converter is a second active frequency converter, and wherein the frequency converter further comprises a second internal amplifying device for amplifying the RF signal before it is received by the mixer.

In some cases, a frequency of each of the incoming radio-signals is an Ultra High Frequency (UHF).

In some cases, the passband of each of the filters is an Ultra High Frequency (UHF) passband.

In some cases, the IF is UHF.

In some cases, the multi-channel communication device, further comprising: a Radio Frequency (RF) power splitter usable for splitting the converted radio-signal into the split radio-signals.

In some cases, the multi-channel communication device, further comprising a frequency hopping mechanism configured to instruct the routing mechanism to switch between frequencies as part of a frequency hopping process, in synchronization with one or more other communication devices, wherein a time required to hop between subsequent frequencies is a time required for the routing mechanism to switch between the subsequent frequencies.

In some cases, the multi-channel communication device, further comprising a transmitter capable of transmitting one or more outgoing signals in an outgoing frequency range, wherein each of the outgoing signals has a corresponding outgoing frequency within the outgoing frequency range, and each of the outgoing signals is filtered by one or more respective filters of the plurality of filters having a passband associated with the outgoing frequency of the outgoing signal.

In some cases, the multi-channel communication device, further comprising a digital bandwidth aggregation mechanism configured to: obtain information having a given outgoing bandwidth, wherein the given outgoing bandwidth is not continuously available within the outgoing frequency range; and generate the outgoing signals so that each outgoing signal covers an available portion of the outgoing frequency range, wherein the outgoing signals, when combined, cover the given outgoing bandwidth.

In some cases, wherein utilization of the filter bank enables the transmitter to simultaneously transmit an outgoing signal while at least one of the receivers receives the corresponding output radio-signal without mutual interference, thereby enabling a full-duplex conversation.

In some cases, there is provided a multi-channel Multiple Input and Multiple Output (MIMO) device, comprising: a plurality of multi-channel communication devices in accordance with the second aspect, wherein each of the multi-channel communication devices receives a corresponding signal as the input radio-signal and each outputs, utilizing the filter bank, a plurality of output frequencies, wherein at least two common frequencies of the output frequencies outputted by at least two of the devices are identical; and a processing resource, wherein the processing resource is configured to: receive the output frequencies and perform MIMO on the at least two common frequencies.

In some cases, there is provided a method of operating a multi-channel communication device in accordance with the first aspect, the method comprising: receiving the input radio-signal; splitting the input radio-signal into the plurality of split radio-signals; filtering each of the split radio-signals with the corresponding selected filter, giving rise to filtered signals; and providing each of the filtered signals to the respective receiver of the receivers.

In some cases, there is provided a method of operating a multi-channel communication device in accordance with the second aspect, the method comprising: receiving the RF radio-signal; converting, using the frequency converter, the RF radio-signal into the converted radio signal; filtering the incoming radio-signals, being the respective converted radio-signal, or the one or more split radio-signals split from the converted radio-signal with the corresponding selected filter, giving rise to filtered signals; and providing each of the filtered signals to the respective receiver of the receivers.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "receiving", "splitting", "filtering", "providing", "converting" or the like, include action and/or processes of a computer that manipulate and/or transform data into other data, said data represented as physical quantities, e.g. such as electronic quantities, and/or said data representing the physical objects. The terms "computer", "processor", "controller", and "processing unit" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1:
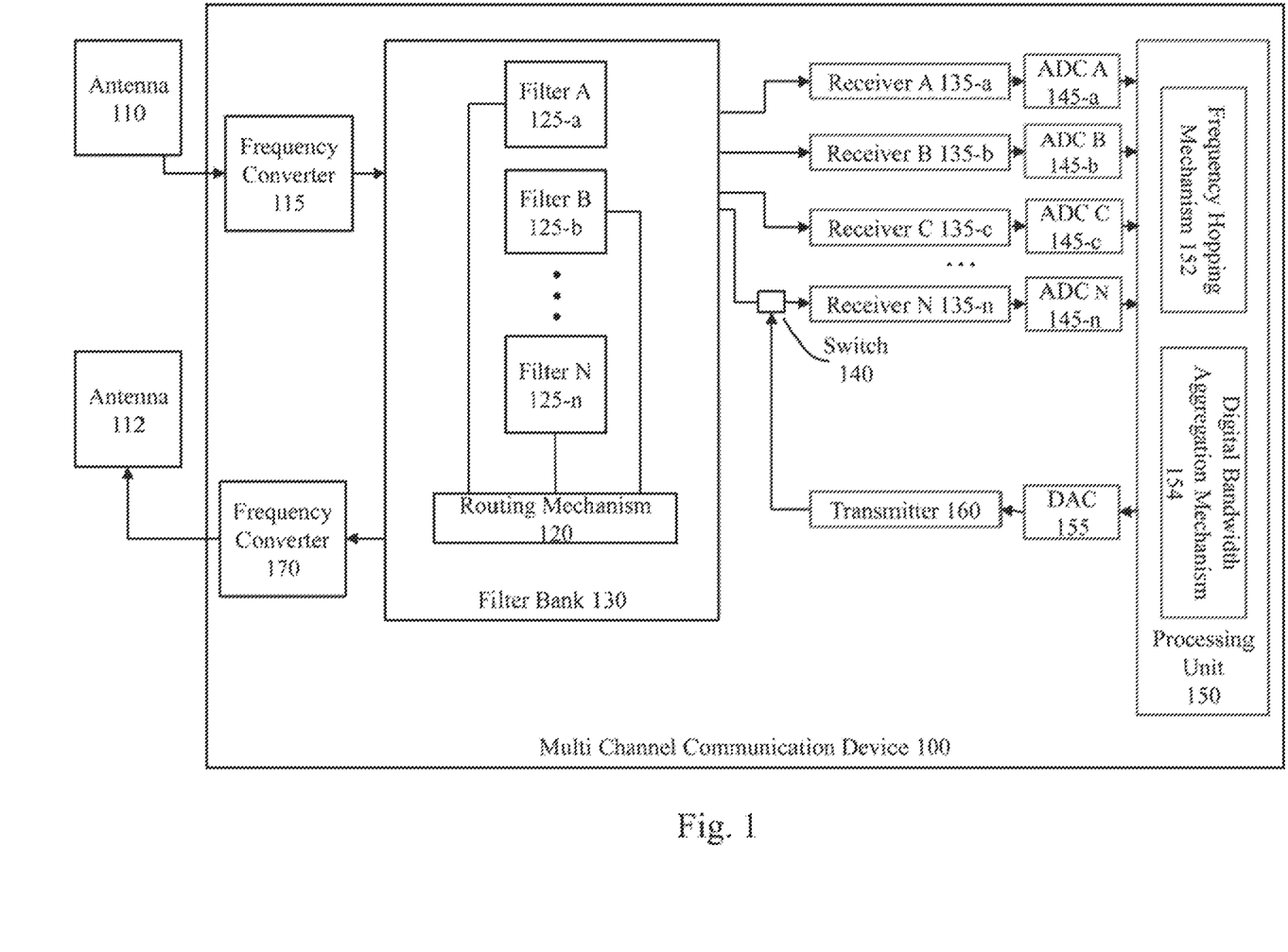
FIG. 1 shows an exemplary block diagram of a multi-channel radio communication device, in accordance with the presently disclosed subject matter.
Figure 2:
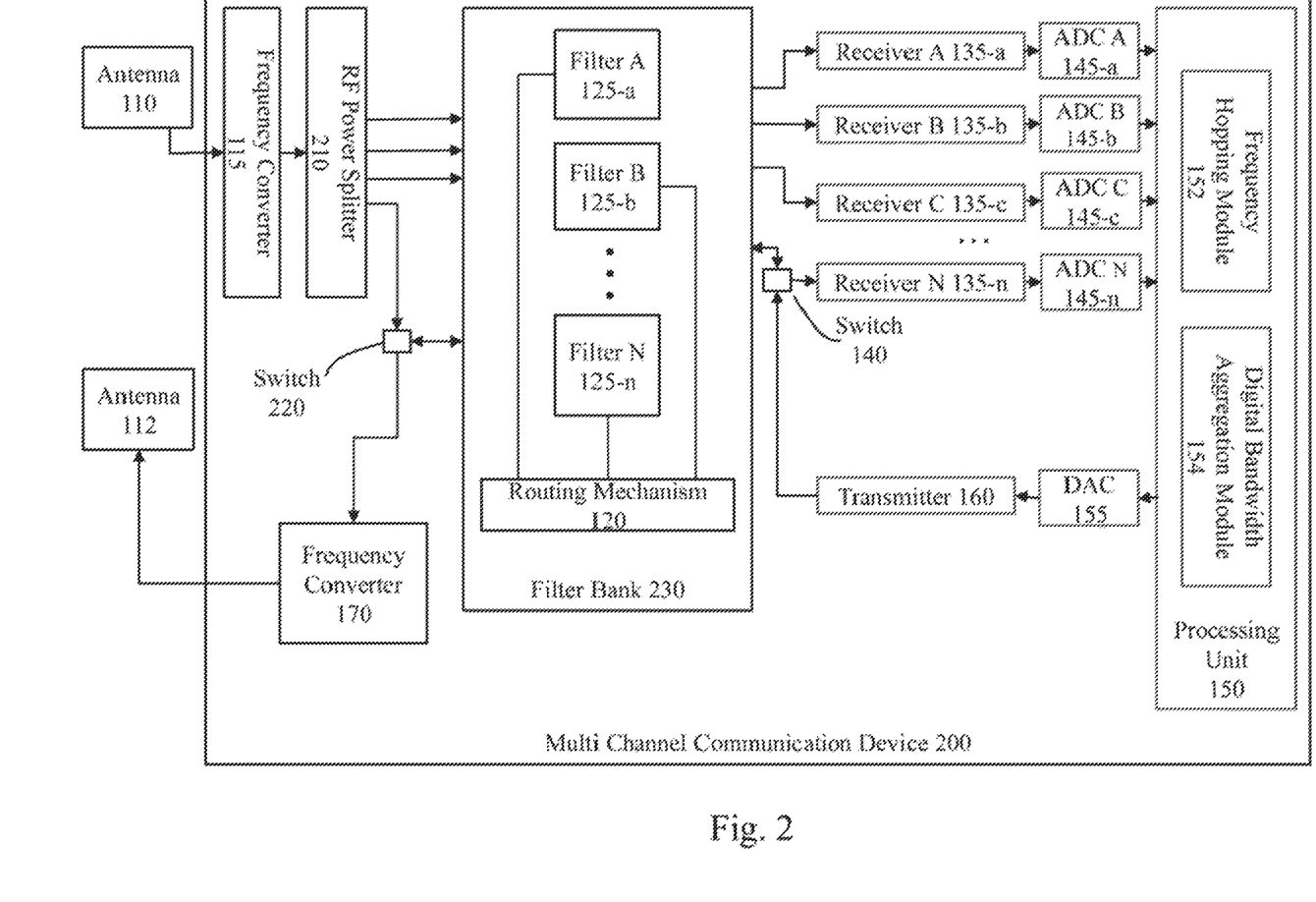
FIG. 2 shows another exemplary block diagram of a multi-channel radio communication device, in accordance with the presently disclosed subject matter.
Figure 6:
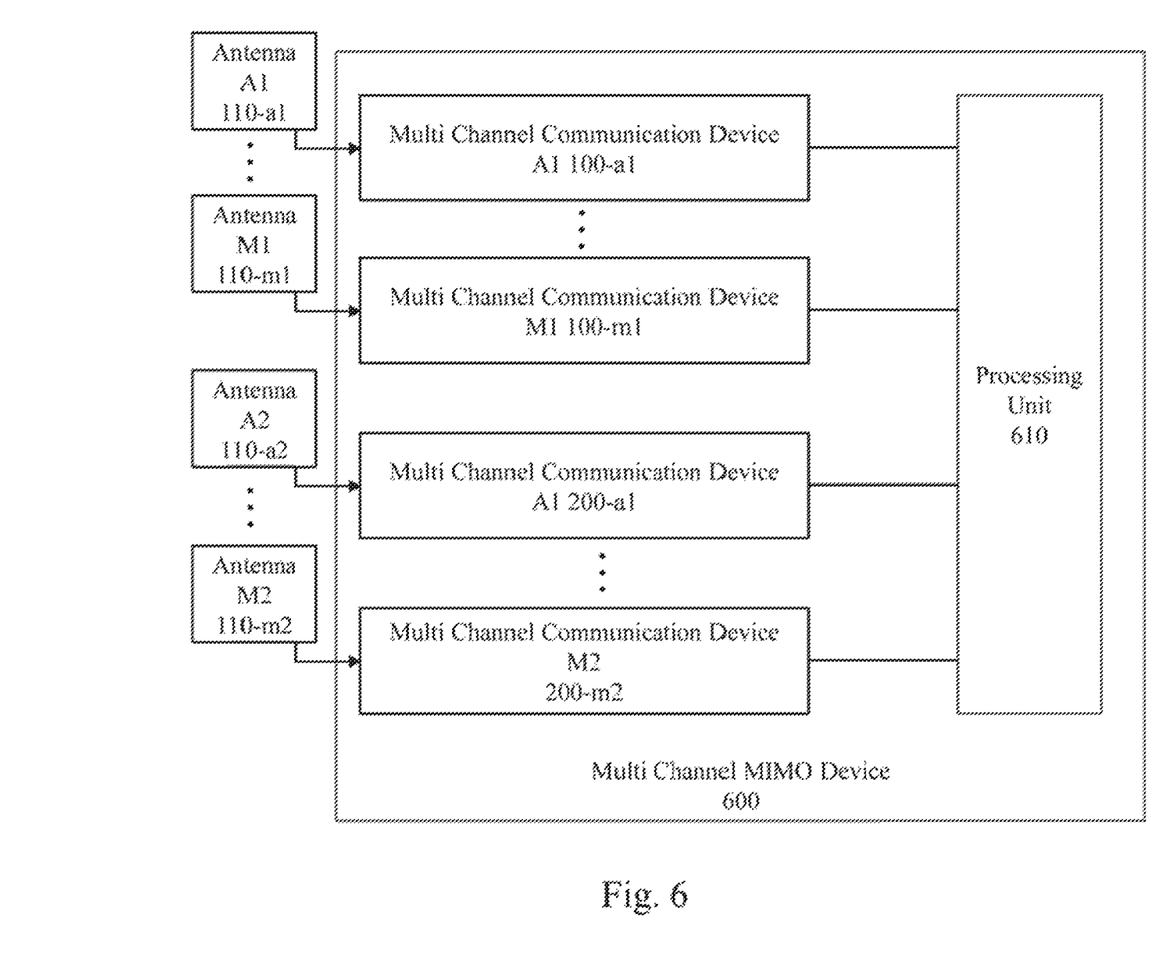
FIG. 6 shows an exemplary block diagram of a multi-channel Multiple Input and Multiple Output (MIMO) device, in accordance with the presently disclosed subject matter.
Figure 7:
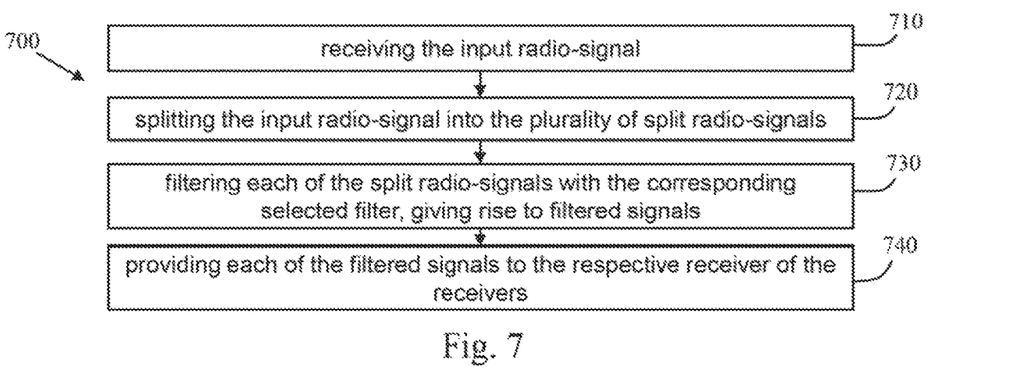
FIG. 7 is a flowchart illustrating one example of a sequence of operations carried out for operating a multi-channel radio communication device, in accordance with the presently disclosed subject matter.
Figure 8:
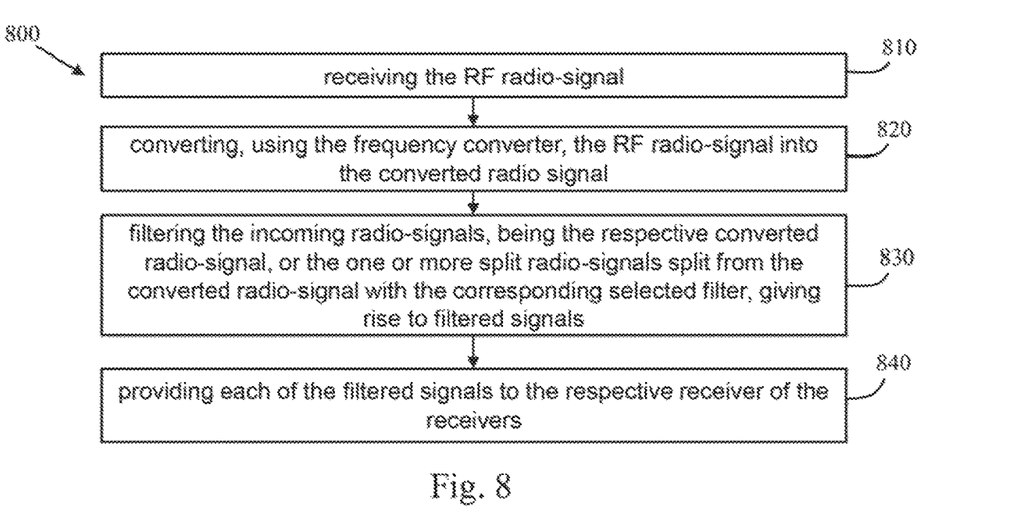
FIG. 8 is another flowchart illustrating another example of a sequence of operations carried out for operating a multi-channel radio communication device, in accordance with the presently disclosed subject matter.

In embodiments of the presently disclosed subject matter, fewer, more and/or different stages than those shown in FIGS. 7-8 may be executed. FIGS. 1, 2, and 6 illustrate a general schematic of the system architecture in accordance with an embodiment of the presently disclosed subject matter. The modules in FIGS. 1, 2, and 6 may be centralized in one location or dispersed over more than one location. In other embodiments of the presently disclosed subject matter, the system may comprise fewer, more, and/or different modules than those shown in FIGS. 1, 2, and 6.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, showing a multi-channel radio communication device, in accordance with the presently disclosed subject matter.

According to the presently disclosed subject matter, a multi-channel communication device 100 is provided. The multi-channel communication device 100 comprises a plurality of receivers (receiver A 135-*a*, receiver B 135-*b*, receiver C 135-*c*, . . . , receiver N 135-*n*), each usable for receiving radio-signals within a corresponding distinct selected frequency band within a spectrum.

The multi-channel communication device 100 further comprises a filter bank 130. The filter bank 130 comprises a plurality of filters (e.g. filter A 125-*a*, filter B 125-*b*, . . . , filter N 125-*n*), each having a respective distinct passband within the spectrum that can be received by the receivers (e.g. receiver A 135-*a*, receiver B 135-*b*, receiver C 135-*c* . . . , receiver N 135-*n*). The filter bank 130 can be fitted on a small printed board.

In some cases, the filters (e.g. filter A 125-*a*, filter B 125-*b*, . . . , filter N 125-*n*) are narrowband filters.

In some cases, the filters (e.g. filter A 125-*a*, filter B 125-*b*, . . . , filter N 125-*n*) are Surface Acoustic Wave (SAW) filters. SAW Filters are filters that operate by converting electrical energy into acoustic or mechanical energy on a piezoelectric material. SAW filters can use InterDigital Transducers (IDTs). IDTs have interleaved metal electrodes on either end of the device which converts an electrical signal into an acoustic wave and then back to an electrical signal. The acoustic waves travel across the surface of an elastic, piezoelectric material with an amplitude decaying into the substrate material. The level of decay is an insertion loss of the SAW Filters.

In some cases, the filters (e.g. filter A 125-*a*, filter B 125-*b*, . . . , filter N 125-*n*) are Bulk Acoustic Wave (BAW) filters. BAW filters operate by converting electrical energy into acoustic or mechanical energy on a piezoelectric material. Compared to SAW filters, BAW filters can operate at higher frequencies.

In some cases, the filters (e.g. filter A 125-*a*, filter B 125-*b*, . . . , filter N 125-*n*) are ceramic filters. Ceramic filters are an electronic component consisting of a piece of a piezoelectric ceramic material with two or more metal electrodes attached.

In some cases, the filters (e.g. filter A 125-*a*, filter B 125-*b*, ..., filter N 125-*n*) are cavity filters. Cavity filters are made of a resonator inside a conducting "box" with coupling loops at the inputs and outputs. The cavity filters can be constructed as cylinders, with an axial tuning capacitor.

In some cases, the filters (e.g. filter A 125-*a*, filter B 125-*b*, ..., filter N 125-*n*) are any other kind of filters having a respective distinct passband within the spectrum that can be received by the receivers (e.g. receiver A 135-*a*, receiver B 135-*b*, receiver C 135-*c* ..., receiver N 135-*n*).

In some cases, the filters (e.g. filter A 125-*a*, filter B 125-*b*, ..., filter N 125-*n*) are any other kind of Radio Frequency (RF) filters.

In some cases, the filters (e.g. filter A 125-*a*, filter B 125-*b*, ..., filter N 125-*n*) can by any combination of SAW filters, BAW filters, ceramic filters, cavity filters, RF filters or any other kind of filters having a respective distinct passband within the spectrum.

The use of filters (e.g. filter A 125-*a*, filter B 125-*b* ..., filter N 125-*n*) enables the multi-channel communication device 100 to achieve effective separation of reception channels and effective attenuation of adjacent blocking signals, all in a single and compact device, as opposed to the complex architecture which includes use of multiple super heterodyne receivers. The filters (e.g. filter A 125-*a*, filter B 125-*b*, ..., filter N 125-*n*) enable reducing co-location interferences and improving the receivers (135-*a*, ..., 135-*n*) selectivity in mobile operated radios (that may be used in tactical environments) and for increasing the dynamic range of the receivers (135-*a*, ..., 135-*n*). Due to the high selectivity of the filters (e.g. filter A 125-*a*, filter B 125-*b*, ..., filter N 125-*n*) the analog signal that is output by the filter bank 130 can be converted to a digital signal (using an Analog to Digital Converter (ADC)), thus solving ADC dynamic range problems that limit the use of ADC capabilities in a simple receiver architecture (such as the direct sampling architecture shortly discussed in the background section herein), with high selectivity performances.

The multi-channel communication device 100 can optionally be comprised within a backpack or implemented in a handheld device, and it can provide longer battery life than other prior art architectures.

The multi-channel communication device 100 can receive an RF signal, that can be received by an antenna 110 to which the multi-channel communication device 100 can be connected. In some case, the RF signal can be an Ultra High Frequency (UHF) signal, however in other cases the RF signal can be a signal of any other frequency domain. The RF signal may have different carrier frequencies within the spectrum. The carrier frequencies are receivable by a corresponding receiver of the receivers (135-*a*, ..., 135-*n*).

The multi-channel communication device 100 can optionally comprise a Band Pass Filter (BPF) configured to filter a given spectral band from the RF signal.

In some cases, the multi-channel communication device 100 can optionally include a frequency converter 115. The frequency converter 115 can receive the RF signal (or the filtered part thereof, as filtered by the BPF) and convert it to another frequency domain, being an Intermediate Frequency (IF) signal. The frequency converter 170 can comprise a Local Oscillator (LO) usable to output a LO signal at a fixed frequency and a mixer usable to receive the RF radio-signal and the LO signal, and to output the IF signal, being the converted radio-signal. In some cases, the passband of the filters (e.g. filter A 125-*a*, filter B 125-*b*, ..., filter N 125-*n*) can be a passband in the UHF frequency domain and the IF signal can be a UHF signal.

In those cases where the RF signal is converted to an IF signal, the receivers (135-*a*, ..., 135-*n*) can receive the converted carrier frequencies that correspond to the carrier frequencies.

The filter bank 130 can receive an incoming radio-signal, being the RF signal, or the IF signal in those cases where the RF signal is converted into an IF signal. The incoming radio-signal at least partially overlaps the passband of one or more of the filters (e.g. filter A 125-*a*, filter B 125-*b*, ..., filter N 125-*n*). The incoming radio-signal can be split to a plurality of split signals in a galvanic manner. The split signals are routed by a routing mechanism 120 (e.g. a switch matrix), into one or more selected filters of the filters (e.g. filter A 125-*a*, filter B 125-*b*, ..., filter N 125-*n*), selected in accordance with the selected frequency band of each of the receivers (135-*a*, ..., 135-*n*), wherein each of the selected filters outputs a corresponding output radio-signal, in the passband of the respective filter, to a respective receiver of the receivers (135-*a*, ..., 135-*n*).

In some cases, the receiver (e.g. 135-*a*, ..., 135-*n*) can amplify the output radio-signal, e.g. by a Low-Noise Amplifier (LNA), and filter it, e.g. using a Low Pass Filter (LPF). The output signal is then converted into a digital signal, using an ADC (e.g. 145-*a*, ..., 145-*n*), and the digital signal is delivered to the processing unit 150. In some cases, although in the illustrated example four ADCs are shown, a single ADC can be used to simultaneously convert the digital signals to analog, or any other number of ADCs can be used for this purpose.

In some cases, the passbands of the filters (e.g. filter A 125-*a*, filter B 125-*b*, ..., filter N 125-*n*) cover all of the spectrum of the incoming radio-signal. The passbands of at least one pair of the filters overlap by at least a bandwidth of the selected frequency band. Each pair of filters (e.g. filter A 125-*a*, filter B 125-*b*, ..., filter N 125-*n*) that has a passband that overlaps, by at least the bandwidth of the selected frequency band, is also referred to herein as an adjacent pair. In some cases, each of the filters (e.g. filter A 125-*a*, filter B 125-*b* ... filter N 125-*n*) has a passband that overlaps at least one passband of another filter (e.g. filter A 125-*a*, filter B 125-*b*, ..., filter N 125-*n*) by at least the bandwidth of the selected frequency band.

Figure 3:
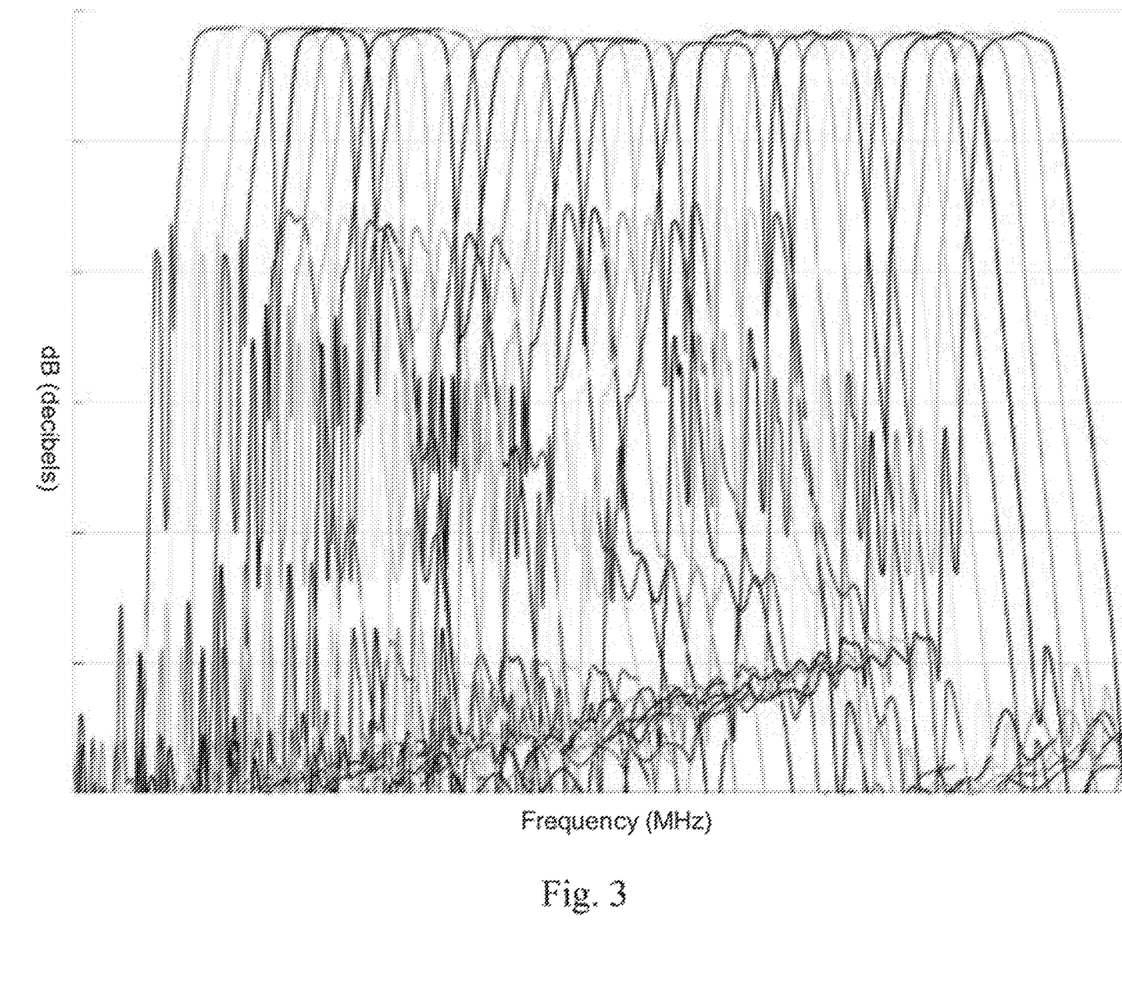
FIG. 3 is a schematic illustration of the separation obtainable using a filter bank, in accordance with the presently disclosed subject matter.

As can be appreciated when looking at FIG. 3, utilization of filters (e.g. filter A 125-*a*, filter B 125-*b*, ..., filter N 125-*n*) enables high spectral selectivity where each filter filters a distinct and narrow slice of frequencies. It can also be appreciated that the passbands of the filters cover all of the spectrum, and that each frequency is covered by an adjacent pair of filters that filter frequencies that overlap by at least 50%.

Figure 4:
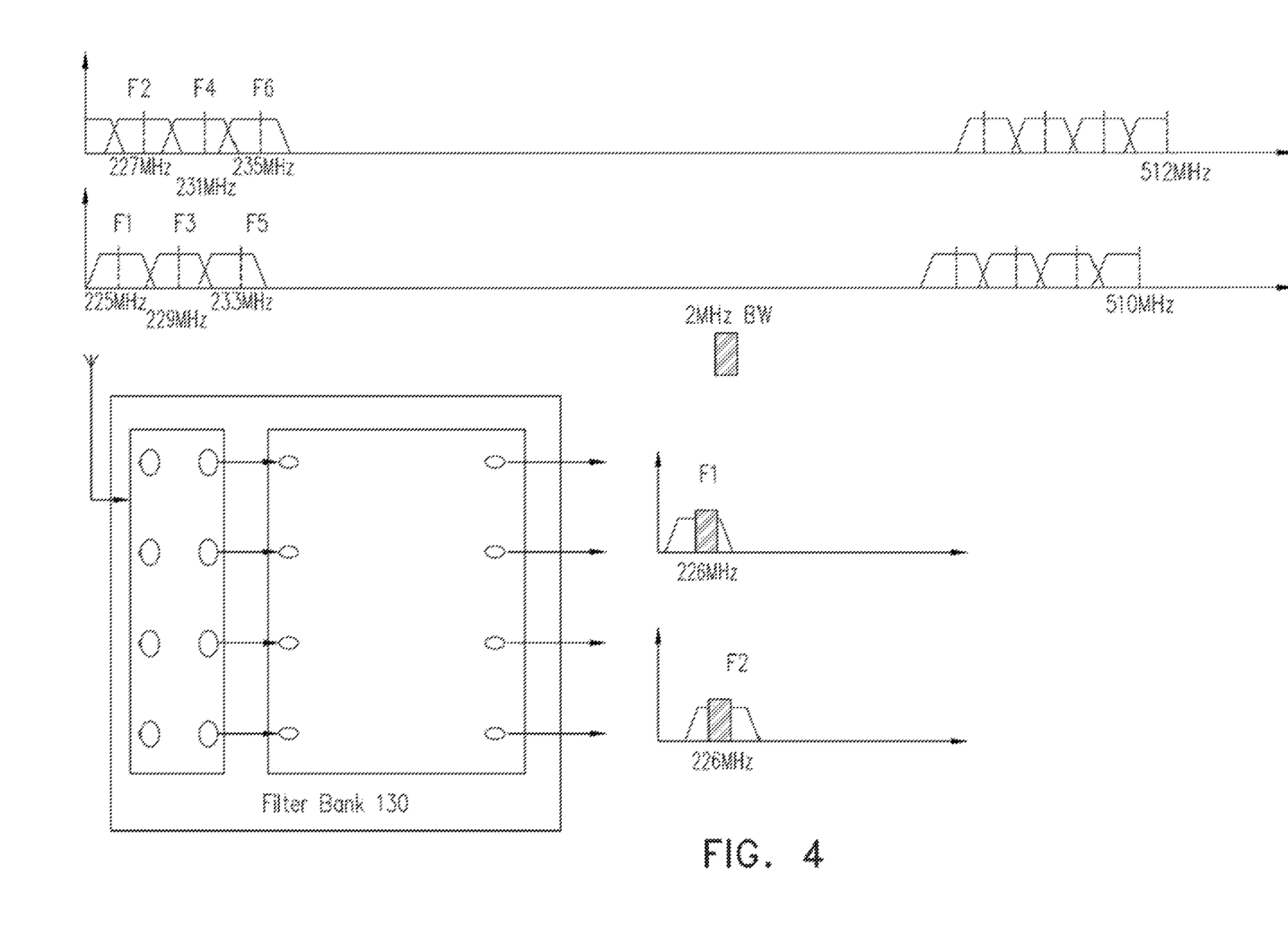
FIG. 4 is a schematic illustration of employing Maximal-Ratio Combining (MRC) using the multi-channel radio communication device, in accordance with the presently disclosed subject matter.

The overlap enables employing Maximal-Ratio Combining (MRC) on at least one of the incoming radio-signals having a frequency within the overlapping portion of the passbands of an adjacent pair of filters (e.g. filter A 125-*a*, filter B 125-*b*, ..., filter N 125-*n*). Looking at FIG. 4, it can be appreciated that F1 and F2, each being one of the filters (e.g. filter A 125-*a*, filter B 125-*b*, ..., filter N 125-*n*), filter an overlapping frequency range. Both F1 and F2 filter a frequency range that encompass the frequency of 226 MHz-228 MHz, thereby enabling employing MRC on the 2 MHz bandwidth of 226 MHz-228 MHz. Clearly this is true for each pair of filters that filter an overlapping frequency range (e.g. F3 and F4, F5 and F6, etc.).

In some cases, the multi-channel communication device 100 can further comprise a transmitter 160. The transmitter 160 can be capable of transmitting one or more outgoing carrier signals in an outgoing frequency range, wherein each of the outgoing signals has a corresponding outgoing frequency within the outgoing frequency range.

In some cases, the transmitter 160 can filter the outgoing frequency range, e.g. using a Low Pass Filter (LPF), and amplify the filtered outgoing frequency range, e.g. by a Low-Noise Amplifier (LNA).

Each of the outgoing signals can be filtered by one or more respective filters of the plurality of filters (e.g. filter A 125-a, filter B 125-b, . . . , filter N 125-n) having a passband associated with the outgoing frequency of the outgoing signal. The outgoing signal can be generated by the processing unit 150 and converted from a digital signal to an analog signal by a Digital to Analog Converter (DAC) 155. In some cases, the transmission channel can be shared with an output channel of the filter bank 130 connected to one of the receivers (e.g. 135-a, . . . , 135-n). In such cases, a switch 140 can exist in the shared channel, enabling switching between a transmission channel when transmission is to be made, and an output channel of the filter bank 130 connected to one of the receivers (e.g. 135-a, . . . , 135-n) when the receiver is to receive a signal.

In some cases, utilization of the filter bank 130 enables the transmitter 160 to simultaneously transmit an outgoing signal while at least one of the receivers (e.g. 135-a, . . . , 135-n) receives the corresponding output radio-signal without mutual interference, thereby enabling a full-duplex conversation.

In some cases, utilization of the filter bank 130 enables the transmitter 160 to transmit in high spectral purity with minimal spectral spreading keeping a low Adjacent Channel Power Ratio (ACPR) and maintaining a high Spurious-Free Dynamic Range (SFDR) ratio.

In some cases, the multi-channel communication device 100 can optionally include a frequency converter 170. The frequency converter 170 can receive an IF signal to be transmitted (e.g. the outgoing frequency range) and convert it to the RF frequency domain that can be transmitted by the antenna 112.

It is to be noted that in some embodiments, antenna 110 and antenna 112 may be one antenna, used both for receiving and transmitting RF signals. In such an embodiment the one antenna will include a switch to substitute the one antenna between receiving and transmitting modes. It is to be noted, that in this embodiment, a full-duplex conversation is not enabled.

The frequency converter 170 can comprise a Local Oscillator (LO) usable to output a LO signal at a fixed frequency and a mixer usable to receive the IF radio-signal and the LO signal, and to output the converted radio-signal. In some cases, the LO's noise is at least reduced using a narrow band filter. In some cases, the frequency converter is a passive frequency converter, and wherein the multi-channel communication device further comprises a first amplifying device for amplifying the RF signal before it is received by the passive frequency converter. In some cases, the frequency converter is an active frequency converter, and wherein the frequency converter further comprises an internal amplifying device for amplifying the RF signal before it is received by the mixer.

In some cases, the multi-channel communication device 100 can further comprise a frequency hopping mechanism 152. The frequency hopping mechanism 152 can be configured to instruct the routing mechanism 120 to switch between frequencies as part of a frequency hopping process, in synchronization with one or more other communication devices (that can optionally be other multiple-channel communication devices 100, or any other communication device capable of frequency hopping). It is to be noted that a time required for the multi-channel communication device 100 to hop between subsequent frequencies is a time required for the routing mechanism 120 to switch between the subsequent frequencies.

In some cases, the multi-channel communication device 100 can further comprise a digital bandwidth aggregation mechanism 154. The digital bandwidth aggregation mechanism 154 can be configured to obtain information having a given outgoing bandwidth, wherein the given outgoing bandwidth is not continuously available within the outgoing frequency range and generate the outgoing signals so that each outgoing signal covers an available portion of the outgoing frequency range, wherein the outgoing signals, when combined, cover the given outgoing bandwidth. A receiving side (that can optionally be other multiple-channel communication devices 100, or any other communication device capable of digital bandwidth aggregation) can then use the outgoing signal (which is received thereby as an incoming signal) in the outgoing frequency range (which is received thereby as an incoming frequency range) in order to reconstruct the information.

Figure 5:
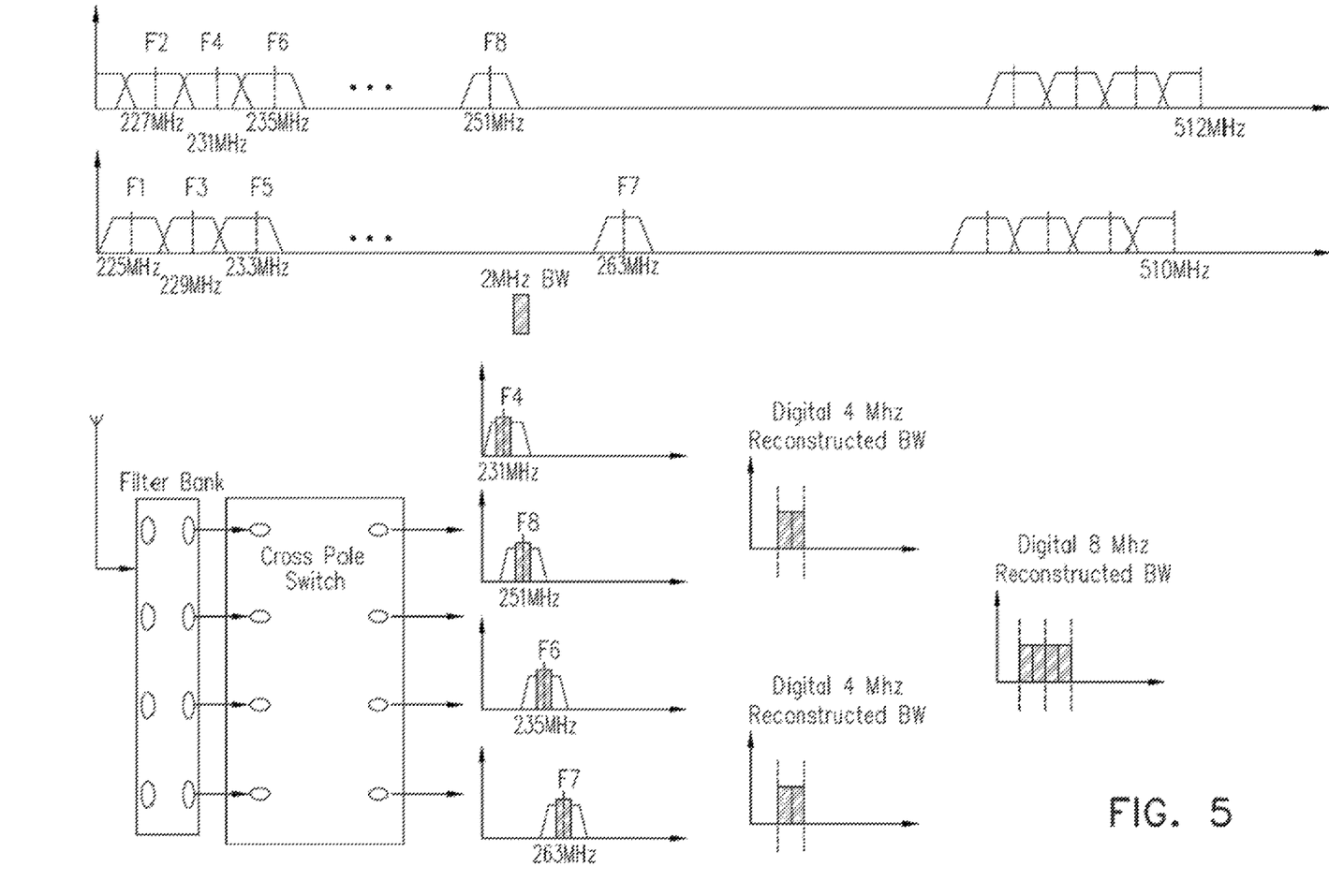
FIG. 5 is a schematic illustration of employing digital bandwidth aggregation using the multi-channel radio communication device, in accordance with the presently disclosed subject matter.

An illustration is provided in FIG. 5, showing an 8 MHz bandwidth aggregation process using distinct slices of 2 MHz bandwidth, where each distinct slice is transmitted at a different frequency. In the illustration it is desirable to transmit the bandwidth between 225 MHz-265 MHz, being an 8 MHz bandwidth. The bandwidth is divided to four slices of 2 MHz bandwidths, where the signal associated with each 2 MHz bandwidth is generated utilizing a respective filter of the filters (e.g. filter A 125-a, filter B 125-b, . . . , filter N 125-n). The bandwidth 231-233 MHz is generated using F4, the bandwidth 251-253 MHz is generated using F8, the bandwidth 235-237 MHz is generated using F6, and the bandwidth 263-265 MHz is generated using F7. On the receiving side, the 8 MHz bandwidth can be reconstructed by receiving each 2 MHz slice filtered by the respective filter of the filters (e.g. filter A 125-a, filter B 125-b, . . . , filter N 125-n). It is to be noted, and emphasized, that although in the illustrated example the 8 MHz bandwidth is non-consecutive, it is by no means limiting, and the 8 MHz bandwidth can be spread into slices of 2 MHz that are adjacent, not adjacent or partly adjacent.

Turning to FIG. 2, there is shown another multi-channel radio communication device, in accordance with the presently disclosed subject matter.

According to the presently disclosed subject matter, a multi-channel communication device 200 is provided. The multi-channel communication device 200 comprises a plurality of receivers (receiver A 135-a, receiver B 135-b, receiver C 135-c, . . . , receiver N 135-n), each usable for receiving radio-signals within a corresponding distinct selected frequency band within a spectrum.

The multi-channel communication device 200 further comprises a filter bank 230, similar to the filter bank 130 as detailed with reference to FIG. 1, with multiple inputs, as opposed to the filter bank 130 having a single input.

Multi-channel communication device 200 can optionally be comprised within a backpack or implemented in a hand-held device, and it can provide longer battery life than other prior art architectures.

The multi-channel communication device 200 can receive an RF signal, that can be received by an antenna 110 to which the multi-channel communication device 200 can be connected. In some case, the RF signal can be an Ultra High Frequency (UHF) signal, however in other cases the RF signal can be a signal of any other frequency domain. The RF signal may have different carrier frequencies within the spectrum. The carrier frequencies are receivable by a corresponding receiver of the receivers (135-a, ..., 135-n).

The multi-channel communication device 200 can optionally comprise a Band Pass Filter (BPF) configured to filter a given spectral band from the RF signal.

In some cases, the multi-channel communication device 200 can optionally include a frequency converter 115, as detailed with reference to FIG. 1.

In those cases where the RF signal is converted to an IF signal, the receivers (135-a, ..., 135-n) can receive the converted carrier frequencies that correspond to the carrier frequencies.

The multi-channel communication device 200 further comprises an RF power splitter 210 usable for splitting an input radio-signal into a plurality (N) of split radio-signals. utilization of the RF power splitter 210 enables at least one pair of distinct selected frequency bands selected by the receivers (e.g. 135-a, ..., 135-n) to have adjacent frequencies. The power splitter 210 splits the input radio-signal in such a way so that the split radio signals do not practically interfere each other. As opposed to the implementation of the multi-channel communication device 200, in multi-channel communication device 100 shown in FIG. 1, the fact that the incoming radio-signal is split in a galvanic manner results in a potential interference between the split radio signals. The fact that the split radio-signals can interfere each other requires maintaining a frequency gap between frequency bands selected by the receivers (i.e. the frequencies selected by the receivers (e.g. 135-a, ..., 135-n) cannot be adjacent frequencies).

The filter bank 230 can receive the plurality of split radio-signals. The split signals are routed by a routing mechanism 120 (e.g. a switch matrix), into one or more selected filters of the filters (e.g. filter A 125-a, filter B 125-b, ..., filter N 125-n), selected in accordance with the selected frequency band of each of the receivers (135-a, ..., 135-n), wherein each of the selected filters outputs a corresponding output radio-signal, in the passband of the respective filter (e.g. filter A 125-a, filter B 125-b, ..., filter N 125-n), to a respective receiver of the receivers (135-a, ..., 135-n).

In some cases, the filters (filter A 125-a, filter B 125-b, ..., filter N 125-n) are narrowband filters.

In some cases, the filters (filter A 125-a, filter B 125-b, ..., filter N 125-n) are Surface Acoustic Wave (SAW) filters. SAW Filters are filters that operate by converting electrical energy into acoustic or mechanical energy on a piezoelectric material. SAW filters can use InterDigital Transducers (IDTs). IDTs have interleaved metal electrodes on either end of the device which converts an electrical signal into an acoustic wave and then back to an electrical signal. The acoustic waves travel across the surface of an elastic, piezoelectric material with an amplitude decaying into the substrate material. The level of decay is an insertion loss of the SAW Filters.

In some cases, the filters (filter A 125-a, filter B 125-b, ..., filter N 125-n) are Bulk Acoustic Wave (BAW) filters. BAW filters operate by converting electrical energy into acoustic or mechanical energy on a piezoelectric material. Compared to SAW filters, BAW filters can operate at higher frequencies.

In some cases, the filters (filter A 125-a, filter B 125-b, ..., filter N 125-n) are ceramic filters. Ceramic filters are an electronic component consisting of a piece of a piezoelectric ceramic material with two or more metal electrodes attached.

In some cases, the filters (filter A 125-a, filter B 125-b, ..., filter N 125-n) are cavity filters. Cavity filters are made of a resonator inside a conducting "box" with coupling loops at the inputs and outputs. The cavity filters can be constructed as cylinders, with an axial tuning capacitor.

In some cases, the filters (filter A 125-a, filter B 125-b, ..., filter N 125-n) are any other kind of filters having a respective distinct passband within the spectrum that can be received by the receivers (receiver A 135-a, receiver B 135-b, receiver C 135-c ..., receiver N 135-n).

In some cases, the filters (filter A 125-a, filter B 125-b, ..., filter N 125-n) are any other kind of Radio Frequency (RF) filters.

In some cases, the filters (filter A 125-a, filter B 125-b, ..., filter N 125-n) can by any combination of SAW filters, BAW filters, ceramic filters, cavity filters, RF filters or any other kind of filters having a respective distinct passband within the spectrum.

In some cases, the receiver (e.g. 135-a, ..., 135-n) can amplify the output radio-signal, e.g. by a Low-Noise Amplifier (LNA), and filter it, e.g. using a Low Pass Filter (LPF). The output signal is then converted into a digital signal, using an ADC (e.g. 145-a, ..., 145-n), and the digital signal is delivered to the processing unit 150. In some cases, although in the illustrated example four ADCs are shown, a single ADC can be used to simultaneously convert the digital signals to analog, or any other number of ADCs can be used for this purpose. 2o In some cases, the passbands of the filters (e.g. filter A 125-a, filter B 125-b, ..., filter N 125-n) cover all of the spectrum of the incoming radio-signal. The passbands of at least one pair of the filters overlap by at least a bandwidth of the selected frequency band. Each pair of filters that has a passband that overlaps, by at least the bandwidth of the selected frequency band, is also referred to herein as an adjacent pair. In some cases, each of the filters (e.g. filter A 125-a, filter B 125-b, ..., filter N 125-n) has a passband that overlaps at least one passband of another filter by at least the bandwidth of the selected frequency band.

The overlap enables employing Maximal-Ratio Combining (MRC) on at least one of the incoming radio-signals having a frequency within the overlapping portion of the passbands of an adjacent pair of filters (e.g. filter A 125-a, filter B 125-b, ..., filter N 125-n).

In some cases, the multi-channel communication device 200 can further comprise a transmitter 160. The transmitter 160 can be capable of transmitting one or more outgoing carrier signals in an outgoing frequency range, wherein each of the outgoing signals has a corresponding outgoing frequency within the outgoing frequency range.

In some cases, the transmitter 160 can filter the outgoing frequency range, e.g. using a Low Pass Filter (LPF), and amplify the filtered outgoing frequency range, e.g. by a Low-Noise Amplifier (LNA).

Each of the outgoing signals can be filtered by one or more respective filters of the plurality of filters (e.g. filter A 125-a, filter B 125-b ..., filter N 125-n) having a passband associated with the outgoing frequency of the outgoing signal. The outgoing to signal can be generated by the processing unit 150 and converted from a digital signal to an analog signal by a Digital to Analog Converter (DAC) 155. In some cases, the transmission channel can be shared with an output channel of the filter bank 230 connected to one of the receivers (e.g. 135-a, ..., 135-n). In such cases, a switch 140 can exist in the shared channel, enabling switching between a transmission channel when transmission is to be made, and an output channel of the filter bank 230 connected to one of the receivers (e.g. 135-*a*, . . . , 135-*n*) when the receiver is to receive a signal.

In some cases, the transmission channel can also be shared with an input channel of the filter bank 230 connected to one of the receivers (e.g. 135-*a*, . . . , 135-*n*). In such cases, a switch 220 can exist in the shared channel, enabling switching between a transmission channel when transmission is to be made through the shared channel, and the input channel of the filter bank 230 connected to one of the outputs of the RF power splitter 210 when the filter bank 230 is to receive a signal through the shared channel.

In some cases, utilization of the filter bank 230 enables the transmitter 160 to simultaneously transmit an outgoing signal while at least one of the receivers (e.g. 135-*a*, . . . , 135-*n*) receives the corresponding output radio-signal without mutual interference, thereby enabling a full-duplex conversation.

In some cases, the multi-channel communication device 200 can optionally include a frequency converter 170, as detailed with reference to FIG. 1.

In some cases, the multi-channel communication device 200 can further comprise a frequency hopping mechanism 152, as detailed with reference to FIG. 1.

In some cases, the multi-channel communication device 200 can further comprise a digital bandwidth aggregation mechanism 154, as detailed with reference to FIG. 1.

Turning to FIG. 6, there is shown a multi-channel Multiple Input and Multiple Output (MIMO) device, in accordance with the presently disclosed subject matter.

According to the presently disclosed subject matter, a multi-channel MIMO device 600 can comprise a plurality of multi-channel communication devices 100 (multi-channel communication device A1 100-*a*1, . . . , multi-channel communication device M1 100-*m*1) as detailed with respect to FIG. 1, and/or a plurality of multi-channel communication devices 200 (multi-channel communication device A1 200-*a*1, . . . multi-channel communication device M2 200-*m*2) as detailed with respect to FIG. 2.

Each of the multi-channel communication devices 100 (multi-channel communication device A1 100-*a*1, . . . , multi-channel communication device M1 100-*m*1) and/or multi-channel communication devices 200 (multi-channel communication device A1 200-*a*1, . . . , multi-channel communication device M2 200-*m*2) can receive a corresponding signal, through an antenna (e.g. antenna A1 110-*a*1, . . . , antenna M1 110-*m*1, antenna A2 110-*a*2, . . . , antenna M2 110-*m*2) as the input radio-signal, and each can output, utilizing the filter bank 130 or the filter bank 230, a plurality of output frequencies. At least two common frequencies of the output frequencies outputted by at least two of the devices (the multi-channel communication devices 100 (multi-channel communication device A1 100-*a*1, . . . , multi-channel communication device M1 100-*m*1) and/or the multi-channel communication devices 200 (multi-channel communication device A1 200-*a*1, . . . , multi-channel communication device M2 200-*m*2)) are identical.

The multi-channel MIMO device 600 further comprises a processing resource 610, configured to receive the output frequencies and perform MIMO on the at least two common frequencies.

The multi-channel MIMO device 600 enables performing MIMO on a plurality of frequencies simultaneously, where each of the frequencies is received by a plurality of receivers of the devices (the multi-channel communication devices 100 (multi-channel communication device A1 100-*a*1, . . . , multi-channel communication device M1 100-*m*1) and/or the multi-channel communication devices 200 (multi-channel communication device A1 200-*a*1, . . . , multi-channel communication device M2 200-*m*2)).

FIG. 7 is a flowchart illustrating one example of a sequence of operations carried out for operating a multi-channel communication device, in accordance with the presently disclosed subject matter.

According to the presently disclosed subject matter, the multi-channel communication device 100, as detailed with reference to FIG. 1, can be configured to receive, through an antenna 110 an input radio-signal (block 710). The input radio-signal can be split, in a galvanic manner, into a plurality of split radio-signals (block 720). Each of the split radio-signals can be routed, by the routing mechanism 120, into a respective selected filter of the filters (e.g. filter A 125-*a*, filter B 125-*b*, . . . , filter N 125-*n*), according to a frequency selection within a corresponding receiver of the receivers (135-*a*, . . . , 135-*n*), giving rise to filtered signals (block 730). Each of the filtered signals is provided to the respective receiver of the receivers (135-*a*, . . . , 135-*n*) in which the selected frequency is the frequency of the filtered signal (block 740).

FIG. 8 is a flowchart illustrating another example of a sequence of operations carried out for operating a multi-channel communication device, in accordance with the presently disclosed subject matter.

According to the presently disclosed subject matter, the multi-channel communication device 200, as detailed with reference to FIG. 2, can be configured to receive, through an antenna 110 an RF radio-signal (block 810). The received RF radio-signal can be converted, using the frequency converter 115, into a converted radio signal (block 820). An incoming radio-signal, being the respective converted radio-signal, or the one or more split radio-signals split from the converted radio-signal (using the RF power splitter 210) with the corresponding selected filter, is routed, by the routing mechanism 120, into a respective selected filter of the filters (e.g. filter A 125-*a*, filter B 125-*b* . . . , filter N 125-*n*), according to a frequency selection within a corresponding receiver of the receivers (135-*a*, . . . , 135-*n*), giving rise to filtered signals (block 830). Each of the filtered signals is provided to the respective receiver of the receivers (135-*a*, . . . , 135-*n*) in which the selected frequency is the frequency of the filtered signal (block 840).

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A multi-channel communication device comprising:
   a frequency converter comprising: a Local Oscillator (LO) usable to output an LO signal at a fixed frequency; and a mixer usable to receive an input Radio Frequency (RF) signal and the LO signal, and to output a converted radio-signal having an Intermediate Frequency (IF);
   a Radio Frequency (RF) power splitter usable for splitting the converted radio-signal into a plurality of split radio-signals;
   a plurality of receivers, each usable for receiving the split radio signals within a corresponding distinct selected frequency band within a spectrum; and
   a filter bank that comprises a plurality of filters each having a respective distinct passband within the spectrum, and a routing mechanism configured to route each of the split radio-signals into respective selected filters of the filters, selected in accordance with the selected frequency band of each of the receivers, wherein each of the selected filters outputs a corresponding output radio-signal, in the passband of the respective filter, to a respective receiver of the receivers.

2. The multi-channel communication device of claim 1, wherein the filters are one or more of: Surface Acoustic Wave (SAW) filters, Bulk Acoustic Wave (BAW) filters, ceramic filters or cavity filters.

3. The multi-channel communication device of claim 1, wherein utilization of the RE power splitter enables at least one pair of distinct selected frequency bands to be adjacent.

4. The multi-channel communication device of claim 1, wherein the passbands of at least one adjacent pair of the filters overlap by at least a bandwidth of the selected frequency band.

5. The multi-channel communication device of claim 4, wherein the overlap enables employing Maximal-Ratio Combining (MRC) on at least one of the incoming radio-signals having a frequency within the overlapping portion of the passbands of the adjacent pair.

6. The multi-channel communication device of claim 1, wherein a frequency of each of the incoming radio-signals is an Ultra High Frequency (UHF).

7. The multi-channel communication device of claim 1, wherein the passband of each of the filters is an Ultra High Frequency (UHF) passband.

8. The mufti-channel communication device of claim 1, further comprising a frequency hopping mechanism configured to instruct the routing mechanism to switch between frequencies as part of a frequency hopping process, in synchronization with one or more other communication devices, wherein a time required to hop between subsequent frequencies is a time required for the routing mechanism to switch between the subsequent frequencies.

9. The multi-channel communication device of claim 1, further comprising a transmitter capable of transmitting one or more outgoing signals in an outgoing frequency range, wherein each of the outgoing signals has a corresponding outgoing frequency within the outgoing frequency range, and each of the outgoing signals is filtered by one or more respective filters of the plurality of filters having a passband associated with the outgoing frequency of the outgoing signal.

10. The mufti-channel communication device of claim 9, further comprising a digital bandwidth aggregation mechanism configured to:
   obtain information having a given outgoing bandwidth, wherein the given outgoing bandwidth is not continuously available within the outgoing frequency range; and
   generate the outgoing signals so that each outgoing signal covers an available portion of the outgoing frequency range, wherein the outgoing signals, when combined, cover the given outgoing bandwidth.

11. The multi-channel communication device of claim 9, wherein the transmitter simultaneously transmits an outgoing signal while at least one of the receivers receives the corresponding output radio-signal without mutual interference.

12. A multi-channel Multiple Input and Multiple Output (MIMO) device, comprising: a plurality of multi-channel communication devices in accordance to claim 1, wherein each of the multi-channel communication devices receives a corresponding signal as the input radio-signal and each outputs, utilizing the filter bank, a plurality of output frequencies, wherein at least two common frequencies of the output frequencies outputted by at least two of the devices are identical; and
   a processing resource, wherein the processing resource is configured to: receive the output frequencies and perform MIMO on the at least two common frequencies.

13. A multi-channel communication device comprising:
   a plurality of receivers, each usable for receiving radio-signals within a corresponding distinct selected frequency band within a spectrum;
   a frequency converter usable to convert a Radio Frequency (RE) signal to a converted radio-signal having an Intermediate Frequency (IF) comprising: a Local Oscillator (LO) usable to output an LO signal at a fixed frequency; and a mixer usable to receive the RF signal and the LO signal, and to output the converted radio-signal having the IF; and
   a filter bank that comprises a plurality of filters each having a respective distinct passband within the spectrum and a routing mechanism;
   wherein the routing mechanism routes one or more incoming radio-signals, being the respective converted radio-signal, or one or more split radio-signals split from the converted radio-signal, into a plurality of selected filters of the filters, the plurality of selected filters being selected in accordance with the selected frequency band of each of the receivers, and
   wherein each of the selected filters outputs a corresponding output radio-signal, in the passband of the respective filter, to a respective receiver of the receivers.

14. The multi-channel communication device of claim 13 wherein the filters are one or more of: Surface Acoustic Wave (SAW) filters, Bulk Acoustic Wave (BAW) filters, ceramic filters or cavity filters.

15. The multi-channel communication device of claim 13, wherein the passbands of at least one adjacent pair of the filters overlap by at least a bandwidth of the selected frequency band.

16. The multi-channel communication device of claim 15, wherein the overlap enables employing Maximal-Ratio Combining (MRC) on at least one of the incoming radio-signals having a frequency within the overlapping portion of the passbands of the adjacent pair.

17. The multi-channel communication device of claim 13, wherein a frequency of each of the incoming radio-signals is an Ultra High Frequency (UHF).

18. The multi-channel communication device of claim 13, further comprising:
a Radio Frequency (RF) power splitter usable for splitting the converted radio-signal into the split radio-signals.

19. The multi-channel communication device of claim 13, further comprising a frequency hopping mechanism configured to instruct the routing mechanism to switch between frequencies as part of a frequency hopping process, in synchronization with one or more other communication devices, wherein a time required to hop between subsequent frequencies is a time required for the routing mechanism to switch between the subsequent frequencies.

20. The multi-channel communication device of claim 13, further comprising a transmitter capable of transmitting one or more outgoing signals in an outgoing frequency range, wherein each of the outgoing signals has a corresponding outgoing frequency within the outgoing frequency range, and each of the outgoing signals is filtered by one or more respective filters of the plurality of filters having a passband associated with the outgoing frequency of the outgoing signal.

21. The multi-channel communication device of claim 20, further comprising a digital bandwidth aggregation mechanism configured to:
obtain information having a given outgoing bandwidth, wherein the given outgoing bandwidth is not continuously available within the outgoing frequency range; and
generate the outgoing signals so that each outgoing signal covers an available portion of the outgoing frequency range, wherein the outgoing signals, when combined, cover the given outgoing bandwidth.

22. The multi-channel communication device of claim 20, wherein the transmitter is capable of simultaneously transmitting an outgoing signal while at least one of the receivers receives the corresponding output radio-signal without mutual interference.

23. A multi-channel Multiple Input and Multiple Output (MIMO) device, comprising: a plurality of multi-channel communication devices in accordance to claim 13, wherein each of the multi-channel communication devices receives a corresponding signal as the input radio-signal and each outputs, utilizing the filter bank, a plurality of output frequencies, wherein at least two common frequencies of the output frequencies outputted by at least two of the devices are identical; and
a processing resource, wherein the processing resource is configured to: receive the output frequencies and perform MIMO on the at least two common frequencies.

24. A method of operating a multi-channel communication device in accordance to claim 1, the method comprising:
receiving the input radio-signal;
converting, using the frequency converter, the input radio-signal into the converted radio-signal;
splitting the converted radio-signal into the plurality of split radio-signals;
filtering each of the split radio-signals with the corresponding selected filter, giving rise to filtered signals; and
providing each of the filtered signals to the respective receiver of the receivers.

25. A method of operating a multi-channel communication device in accordance to claim 13, the method comprising:
receiving the RF radio-signal;
converting, using the frequency converter, the RF radio-signal into the converted radio signal;
filtering the incoming radio-signals, being the respective converted radio-signal, or the one or more split radio-signals split from the converted radio-signal with the corresponding selected filter, giving rise to filtered signals; and
providing each of the filtered signals to the respective receiver of the receivers.

\* \* \* \* \*